2,822,581
AMYLOSE FILMS

Johannes Muetgeert, Rotterdam, and Pieter Hiemstra, Veendam, Netherlands, assignors to Cooperatieve Verkoop-en Productievereniging van Aardappelmeel en Derivaten "Avebe" G. A., Veendam, Netherlands, a corporation of the Netherlands No Drawing. Application April 15, 1955
Serial No. 501,744

Claims priority, application Netherlands April 22, 1954

7 Claims. (Cl. 18—57)

It is known that starch consists of two components, amylose and amylopectine, also called A and B fractions.

It has previously been known that amylose may be dissolved in water by heating it to a high temperature, as e. g. 150° C. On cooling these solutions the material re-precipitated as "artificial starch."

Amylose films were prepared by slowly evaporating such an amylose solution, as a result of which an amylose film was formed on the surface. These films, which were made for experimental purposes, cannot be used for other purposes; they are cloudy, have a granular structure and have only a very low strength.

It has also been known to dissolve native starch in an aqueous alkali solution at a temperature of about 70° C., and to cool the solution upon a support to form an aqueous film and to remove the solvent by evaporation. Films thus obtained only have little tensile strength, especially in wet conditions.

A slightly better result is obtained by dissolving the amylose in a solution of a so-called complexing agent in water and to cast films from this solution. Examples of complexing agents are: lower aliphatic alcohols such as ethyl alcohol, propyl alcohol, butyl alcohol, amyl alcohol, etc., various glycol ethers, pyridine, etc.

The U. S. Patent No. 2,608,723 describes a process for the preparation of amylose films, according to which amylose is dissolved in water by means of a complexing agent at increased temperature, after which the complexing agent is removed by azeotropic distillation. The remaining aqueous amylose solution is used to cast films; it seems that the quality of these films is considerably better than that of films obtained by evaporating a solution prepared by dissolving starch in water and also better than that of films, cast from a solution of amylose in a solution of a complexing agent in water. By the use of these complexing agents the procedure is, however, rather expensive.

It is the object of the invention to provide an improved process for the production of amylose films of superior quality with an inexpensive process.

It is a further object of the invention to prepare transparent, pliable amylose films, which also have a good tensile strength when wet.

According to the invention strong, pliable and transparent amylose films are prepared by dissolving at least 5% of starch carbohydrate containing at least 50 percent by weight of amylose in water at a temperature of at least 120° C. and preferably lying in the range of 140–165° C., cooling the solution to a temperature below the boiling point at ordinary atmospheric pressure, and casting a film from the clear solution on a support having a temperature higher than the gelation temperature of the solution, after which the film is dried and cooled.

The casting may be carried out batch-wise, but preferably by methods for producing continuously cast films, as casting upon a rotatory drum or on a moving belt.

The concentration of the amylose determines the lowest admissible temperature of the drum or belt, which must be higher than the gelation temperature of the amylose solution. For a solution containing only 5% by weight of amylose in water a temperature of about 50° C. is sufficient, whereas for a 10% solution the temperature must be at least 60° C. and for a 15% solution at least 70° C. Apart from the concentration effect on gelation, there also exists a dependence of the gelation temperature on the average molecular weight of the carbohydrate. The data given refer to an amylose preparation with an average molecular weight of about 120,000. Solutions containing up to 25% of amylose have been used in the process of the invention.

Amylose is preferably dispersed in water with a pH of approx. 7, to which 0.05% sodium sulphite has been added, in a quantity of approx. 15% by weight and this dispersion is heated to 160° C. in an autoclave or by passing it through a device of heated tubes for 5–8 minutes, and subsequently quickly cooled to 100° C. Heating for a longer time at a higher temperature than is necessary for dissolving the amylose is detrimental, since always some degradation takes place; however, after cooling to 100° C. the solution is stable for a long time. After filtration the solution, having a temperature lying between the gel temperature and the boiling point, is cast on a smooth support having a temperature above the gel temperature and is dried and cooled on this support. The solution gelates first and changes into a clear amylose film after further drying.

To prevent degradation at a high temperature it is preferred to dissolve the amylose by passing the aqueous amylose suspension through heated tubes, in which the suspension may be heated to the desired temperature in a short time.

On dissolving the amylose at a temperature of less than 120° C. no clear solutions are formed and the films obtained from such a solution have a granular structure. Therefore dissolving temperatures of more than 120° C. are applied.

The maximum dissolving temperature is determined by the speed of working; heating for too long a time at too high a temperature causes degradation of the amylose, resulting in decreased strength of the films obtained therefrom. Temperatures of 140–165° C. are found to give favourable results.

The concentration of the amylose in the solution may be as low as 5%. At a lower concentration it is very difficult to obtain satisfactory results. Preferably concentrations of between 10 and 20% are used, but also with higher concentrations, up to about 25%, good results were achieved.

Sodium sulphite is added to prevent coloration of the solution. In most cases a quantity of about 0.05% by weight will be sufficient, but in some cases, depending on the oxygen content of the autoclave, a greater quantity of up to 0.2% may be used.

During casting it is advantageous to keep the temperature so high that part of the water can be evaporated before a gel is formed from the solution.

The support used may e. g. be glass or a smoothly chromed metal plate. The films are easily loosened from this support if it is degreased before casting with lime and is rubbed with a little talcum powder. Also pretreatment of the support with a highly diluted silicone solution has a favourable influence upon the loosening of the film from the support.

Drying should preferably start immediately after or even during the casting of the solution. The drying air may have a temperature of 90–110° C., provided it has a high relative moisture content of e. g. between 40–80% at the end of the drying process and it is especially important that a high relative moisture content of the air is maintained on cooling. At the beginning of the drying process the relative moisture may be low, but at the moment the original white gel becomes clear and transparent a relative moisture content of the drying air of at least 40% is favourable. Also during cooling at least the same relative moisture content of the air is required, but higher moisture contents, preferably of over 60% and even up to 100%, are preferred, since during cooling considerable shrinkage occurs which the film cannot bear if in too dry a state, so that on cooling in too dry a medium the film may rupture.

As a matter of course these precautions are not or to a much less extent necessary if care is taken that already during drying a plasticizer is present in the film. The plasticizers which may be applied are for example those used for cellulose film, e. g. glycerol and sorbitol.

In itself it is not important in what way the amylose started from is obtained. However, it is important that it is prepared without considerable degradation, while also during the dissolving of the amylose the procedure should be such that the molecular weight preferably does not fall below 120,000.

Table I shows some particulars of amylose films prepared according to the invention, both with and without plasticizer, and of varying molecular weights, while for the sake of comparison the same data of a commercial film of regenerated cellulose with a plasticizer have been taken up:

Table I

| Sample | Mol. weight amylose | Tensile strength, kg./cm.² | Elongation at break, percent of the initial length |
|---|---|---|---|
| regenerated cellulose | | 1,260 | 54 |
| amylose | 120,000 | 730 | 8 |
| amylose +20% sorbitol | 120,000 | 490 | 37 |
| amylose +10% sorbitol | 120,000 | 620 | 10.5 |
| amylose | 90,000 | 530 | 9 |
| amylose +20% glycerol | 90,000 | 325 | 18 |
| amylose +10% glycerol | 90,000 | 440 | 13 |
| amylose | 150,000 | 950 | 8 |

When judging the properties of the amylose films it should be taken into account that pollutions have a considerable influence upon the tensile strength. If the amylose has been obtained by separating starch into the components by means of an aqueous solution of magnesium sulphate, the amylose should be substantially freed from magnesium sulphate in order to obtain films with a tensile strength which is as favourable as possible; a few percentages of MgSO₄ reduce the strength considerably.

It is possible to replace part of the amylose by amylopectine without impairing the properties of the films considerably; if there is over 50% of amylopectine the film obtained is, however, no longer water-resistant for normal use.

Table II gives a survey of the tensile strength and elongation at break of films, containing various amounts of amylopectine. The films were prepared by dissolving a mixture of practically pure amylose and practically pure amylopectine in varying proportions in an amount of 10% by weight of carbohydrate on water by heating a suspension for 5 minutes at 160° C., cooling the solution to about 80° C. and casting it on a preheated glass plate. After drying the films were conditioned in air of 21° C. having a degree of moisture of 65% and were tested under the same conditions.

Table II

| percent by weight of amylopectine | plasticizer | tensile strength, kg./cm.² | elongation at break in percent |
|---|---|---|---|
| 0 | none | 690 | 9 |
| 10 | do | 750 | 7 |
| 20 | do | 795 | 24 |
| 30 | do | 750 | |
| 40 | do | 750 | 14 |
| 50 | do | 680 | |
| 60 | do | 525 | |
| 70 | do | 320 | 5 |
| 0 | 10% glycerol. | 460 | 22 |
| 10 | do | 490 | 34 |
| 20 | do | 450 | 43 |
| 30 | do | 430 | 36 |
| 40 | do | 41 | 34 |
| 50 | do | 370 | 34 |
| 60 | do | 280 | 32 |
| 70 | do | 95 | 26 |

It is clear that an addition of between 10 and 20% of amylopectine to amylose results in films having a higher tensile strength as compared with a film of pure amylose. Therefore it is preferred to use a mixture of between 80–90% of amylose and of 10–20% of amylopectine.

A special advantage of amylose film is that it is completely digestible in case of consumption, as a result of which it is much more suitable for application in food industry than films of regenerated cellulose.

In those cases where it is desirable for special applications, covering layers may be applied on the amylose films to affect the properties.

EXAMPLE

A slurry, containing 15% by weight of amylose, 0.05% by weight of sodium sulphite and 5% of glycerol was heated to 160° C. in about two minutes and kept at that temperature for about 4 minutes by passing it through heated tubes. The amylose dissolved to a clear solution. After cooling to about 95° C. this solution was filtered through a hot filter press at 95° C. to remove a minor quantity of undissolved mater and poured on a chrome plated rotary belt of a temperature of about 85° C. and dried in hot air of 100° C. with a moisture content of about 65%. After drying, the film—still on the belt—is cooled to room temperature in air of about 22° C. with a moisture content of about 100% and easily loosened from the belt.

Smooth, flexible, transparent films were obtained with a thickness which, depending on the feed of amylose solution to the belt, varied from 0.01 to 0.07 mm., with tensile strengths of about 600 kg./cm.².

We claim:

1. The process for the preparation of strong, pliable and transparent films comprising dissolving a starch-carbohydrate containing at least 50 percent amylose in water in an amount sufficient to provide an amylose concentration of at least 5% by weight therein at a temperature of at least 120° C., cooling the solution to a temperature beneath its boiling point at atmospheric pressure and casting a film from the solution on a support having a temperature higher than the gelation temperature of the solution, after which the film is dried and cooled on the support and liberated from the support.

2. The process of claim 1, wherein the dissolving temperature is of 140–165° C.

3. The process of claim 1, wherein the concentration of the starch-carbohydrate is between 10–20 percent.

4. The process of claim 1, in which water, containing less than 0.2% of sodium sulphite is used.

5. The process for the preparation of strong, pliable and transparent films comprising dissolving a starch-carbohydrate containing between 80–90% of amylose and of 10–20% of amylopectine in water in an amount sufficient to provide an amylose concentration of at least 5% by weight therein at a temperature of at least 120° C., cooling the solution to a temperature beneath its boiling point at atmospheric pressure and casting a film from the solution on a support having a temperature higher than the gelation temperature of the solution, after which the film is dried and cooled on the support and liberated from the support.

6. The process for the preparation of strong, pliable and transparent films comprising dissolving a starch-carbohydrate containing at least 50 percent amylose having an average molecular weight of at least 120,000, in water in an amount sufficient to provide an amylose concentration of at least 5% by weight at a temperature of at least 120° C., under conditions of dissolving time and temperature preventing degradation of the amylose to an average molecular weight of less than 120,000 to form a clear solution, cooling the solution to a temperature beneath its boiling point at atmospheric pressure and casting a film from the clear solution on a support having a temperature higher than the gelation temperature of the solution, after which the film is dried and cooled on the support and liberated from the support.

7. The process for the preparation of strong, pliable and transparent films comprising dissolving a starch-carbohydrate containing at least 50 percent amylose in water in an amount sufficient to provide an amylose concentration of at least 5% by weight at a temperature of at least 120° C. to form a clear solution, cooling the solution to a temperature beneath its boiling point at atmospheric pressure and casting a film from the clear solution on a support having a temperature higher than the gelation temperature of the solution, after which the film is dried and cooled on the support in air having a degree of humidity of at least 60% and liberated from the support.

References Cited in the file of this patent

UNITED STATES PATENTS

| | | |
|---|---|---|
| 2,137,171 | Levey | Nov. 15, 1938 |
| 2,221,019 | Clarke | Nov. 12, 1940 |
| 2,608,723 | Wolff et al. | Sept. 2, 1952 |

U. S. DEPARTMENT OF COMMERCE
PATENT OFFICE

CERTIFICATE OF CORRECTION

Patent No. 2,822,581 — February 11, 1958

Johannes Muetgeert et al.

It is hereby certified that error appears in the printed specification of the above numbered patent requiring correction and that the said Letters Patent should read as corrected below.

Column 4, Table II, under the heading "tensile strength, kg./cm.$^2$", and opposite "40", for "41" read -- 410 --; line 43, for "mater" read -- matter --.

Signed and sealed this 1st day of April 1958.

(SEAL)
Attest:
KARL H. AXLINE

Attesting Officer

ROBERT C. WATSON
Commissioner of Patents